United States Patent [19]

Lorenz et al.

[11] Patent Number: 5,064,423
[45] Date of Patent: Nov. 12, 1991

[54] ACCELERATION AID FOR AN INTERNAL COMBUSTION ENGINE HAVING AN EXHAUST-DRIVEN TURBOCHARGER

[75] Inventors: Jürgen Lorenz; Jürgen Ensner; Nunzio D'Alfonso, all of Nuremberg, Fed. Rep. of Germany

[73] Assignee: MAN Nutzfahrzeuge Aktiengesellschaft, Munich, Fed. Rep. of Germany

[21] Appl. No.: 485,601

[22] Filed: Feb. 27, 1990

[30] Foreign Application Priority Data

Feb. 28, 1989 [DE] Fed. Rep. of Germany ....... 3906312

[51] Int. Cl.$^5$ .............................................. F02B 33/44
[52] U.S. Cl. ........................................ 60/611; 123/586
[58] Field of Search ......................... 60/611, 612, 609; 123/559.1, 564, 585, 586

[56] References Cited

U.S. PATENT DOCUMENTS 3,673,796  7/1972  Weick et al. ..................... 123/564

FOREIGN PATENT DOCUMENTS 3100732  7/1982  Fed. Rep. of Germany .
57-56623  5/1982  Japan .

Primary Examiner—Richard A. Bertsch
Assistant Examiner—Charles Freay
Attorney, Agent, or Firm—Robert W. Becker & Associates

[57] ABSTRACT

An auxiliary combustion air supply arrangement for an internal combustion engine having a combustion air supercharger driven by an exhaust gas turbine. During time periods characterized by lack of sufficient exhaust gas energy, in order to increase the supply of air to the intake manifold of the engine, auxiliary combustion air is obtained directly from a compressed air tank and is supplied to the intake manifold via an appropriate control mechanism. A delay element as part of the fuel injection system is provided, whereby the control mechanism as well as the delay element are actuated by operation of a gas pedal, as a result of which the supply of auxiliary combustion air precedes the fuel injection, with injection of the full fuel injection quantity not being initiated until later.

7 Claims, 2 Drawing Sheets

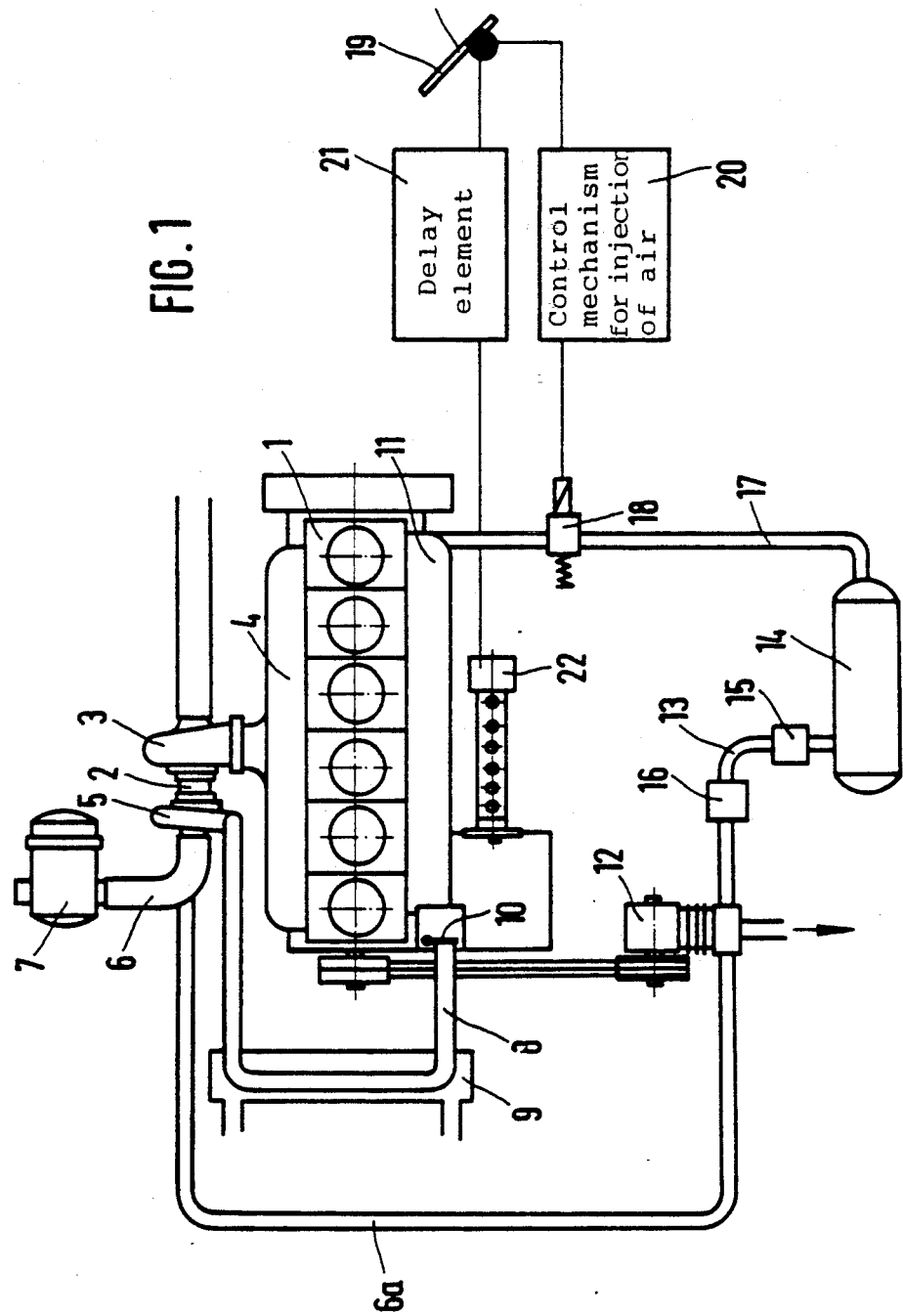

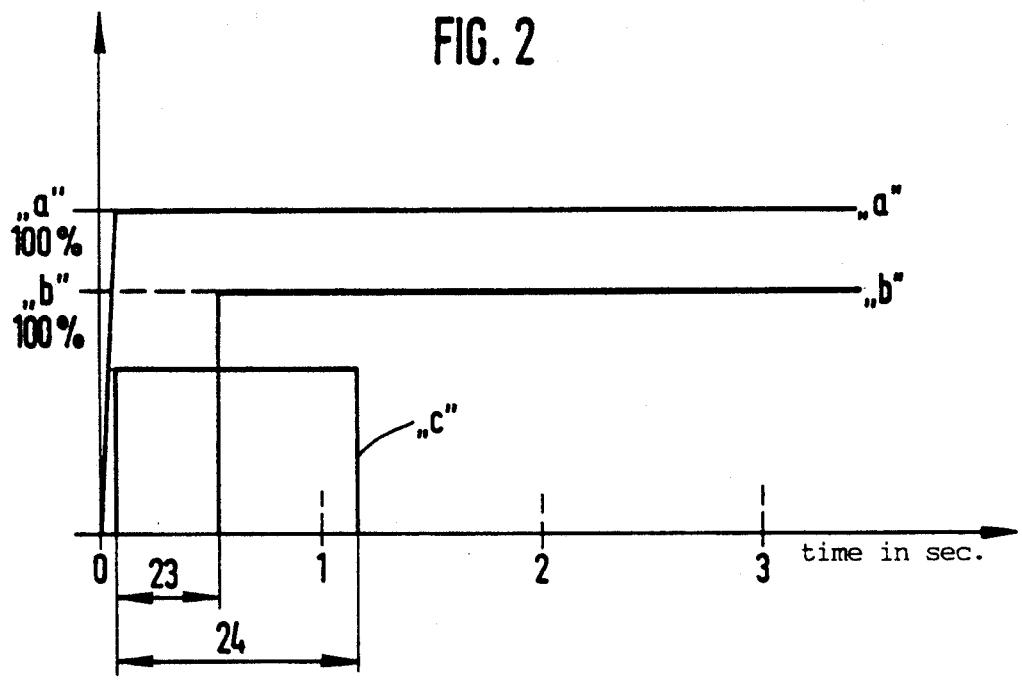
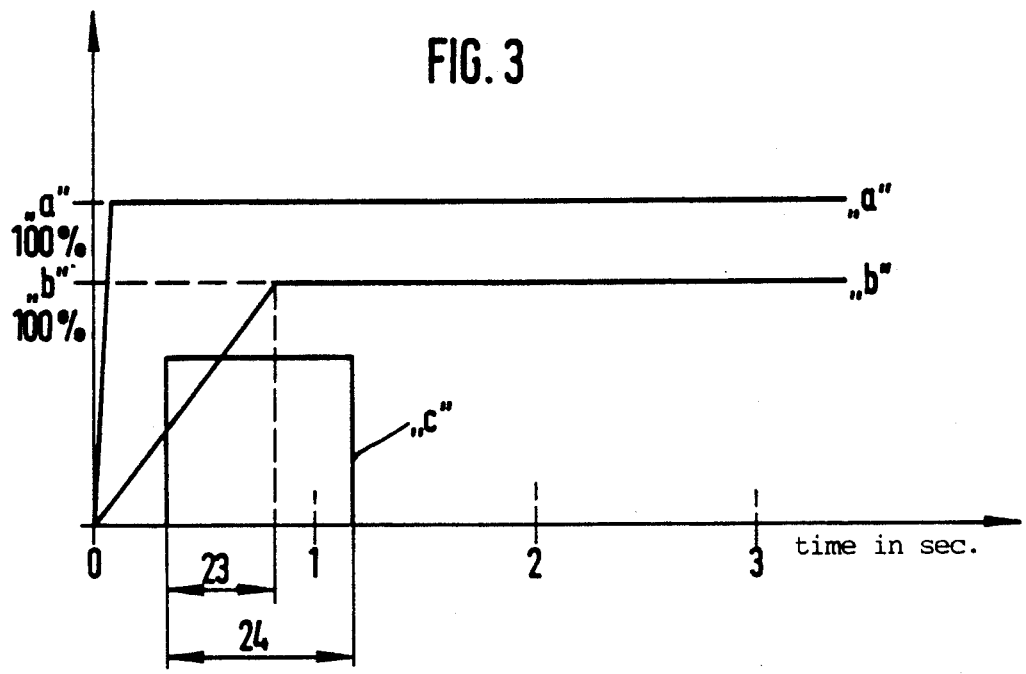

ACCELERATION AID FOR AN INTERNAL COMBUSTION ENGINE HAVING AN EXHAUST-DRIVEN TURBOCHARGER

BACKGROUND OF THE INVENTION

The present invention relates to an internal combustion engine that has an exhaust-driven turbocharger and improved acceleration characteristics.

Preferred objectives during the development of improved drive units for commercial operation are a good combustion start, low consumption, as well as as low an environmental pollution due to engine exhaust as possible. To realize these objectives, these days supercharged engines having a high power density are increasingly used. The boosting of the mean effective pressure is generally drawn from exhaust-driven turbochargers. The additional cooling of the combustion air effects a further increase of the effective mean pressure.

Due to their high specific performance, Diesel engines having exhaust-driven turbochargers and combustion air cooling have a number of advantages over naturally aspirated engines:

the relative proportion of frictional losses at the indicated performance is less, thereby reducing the consumption of fuel;

the smaller overall size permits a more flexible design of the passenger space; and a lower price due to a lower expense for material.

Opposing the aforementioned advantages is the known problem of the retarded response time of exhaust-driven turbocharged engines ("turbo lag"). In addition, the lack of sufficient air during the acceleration processes leads to a pronounced burst of smoke.

Various proposals have been made to improve the acceleration characteristic. These proposals are essentially based upon the idea of supplying to the engine the missing quantity of air that exists at an increased load state from the outside (air injection), or to provide this air at an earlier point in time via a more rapid operation of the turbocharger.

For example, it is known to realize the injection of the auxiliary combustion air into the intake pipe or manifold by using an auxiliary compressor having an auxiliary drive. In this connection, it would also be possible to use a compressed air tank, although only for driving the auxiliary drive. An appropriate check flap is in this connection disposed in the intake line of the main compressor (see German Patent 31 00 732).

A drawback of this known arrangement is that during the air injection, the entire space of the conduits (up to the then closed check flap) must first be filled, as a result of which the turbocharger is even slowed down for a short period of time (reduction of the speed of the exhaust-driven turbocharger). A particular disadvantage is such an arrangement of the check flap when using a combustion air cooler, which is disposed between the compressor and the intake manifold. Since the auxiliary air is produced by an additional turbocharger, pressure is built up relatively slowly in the system, which readily meets the expectations of an improvement of acceleration for the there existing application, namely use for large engines, primarily at a steady operation. The air injection is in such a case effected relatively seldom, whereby a large quantity of compressed air is slowly generated and is kept available for a longer period.

A more effective air injection, also of the aforementioned general type, is known from U.S. Pat. No. 3,673,796, Weick et al, since here the check flap is disposed in the immediate vicinity of the intake manifold after the compressor. The subject matter of this reference (the speed of the drive motor of a power generator is to be kept constant) similarly relates to an improvement of the load assumption or response characteristic of engines having exhaust-driven turbochargers by providing an adequate quantity of compressed air.

During intermittent vehicle operation, especially of commercial vehicles, where air injections are frequently required, it is desirable, however, to not only improve the acceleration time, but also to eliminate the burst of smoke that occurs during the acceleration (it is particularly desired to achieve a reduction of particulate emission). Heretofore known references offer no solutions for this problem.

In conformity with the desire of the driver, during a normal acceleration process from low load and speed, by stepping on the gas pedal the quantity of fuel to the combustion chamber of the engine is immediately increased, resulting in initiation of acceleration. At this moment, inadequate mixture formation conditions exist in the combustion chamber, i.e. the swirl generated in the intake port, the turbulence in the combustion chamber, as well as the atomization and distribution of the fuel, are too unfavorable for a clean combustion of the increased quantity of fuel.

This known fact applies not only to naturally aspirated engines but also to supercharged engines. Since with supercharged engines, especially turbocharged engines, this problem is greater than with naturally aspirated engines due to the time lag of the charging arrangement, engines with exhaust-driven turbochargers have at their disposal a fuel quantity limitation that is a function of charging pressure (LDA). This LDA regulation ensures that during the acceleration process, the fuel quantity is released in conformity with the charging pressure, but with a necessary acceleration surplus.

The fuel quantity cannot be limited by the LDA in such a way that the exhaust gas quality has the same favorable values as in a steady operation, since otherwise the acceleration of the vehicle would not be acceptable.

As already indicated, even the use of the aforementioned air injection pursuant to U.S. Pat. No. 3,673,796 does not aid in improving the exhaust gas quality, since with this patent, which has the object of keeping a certain speed constant, it is inherently necessary to release the increased quantity of fuel injection into the combustion chamber practically simultaneously with the injection of air into the intake manifold. The result is that in the time between the suddenly increased fuel injection and the time that the compressed air arrives in the combustion chamber, the previously described phase of a lack of sufficient combustion air exists. Under these conditions, a pronounced burst of smoke must be reckoned with.

It is therefore an object of the present invention for internal combustion engines that have an exhaust-driven turbocharger, especially such engines that are used in commercial vehicles that predominantly operate in an intermittent manner, to alter the conventional acceleration sequence, while using an auxiliary combustion air supply of the aforementioned general type, in such a way that a burst of exhaust gas smoke (especially the increase of particulates) is entirely prevented.

BRIEF DESCRIPTION OF THE DRAWINGS

This object, and other objects and advantages of the present invention, will appear more clearly from the following specification in conjunction with the accompanying schematic drawings, in which:

FIG. 1 diagrammatically illustrates one exemplary embodiment of the inventive engine arrangement in conjunction with the turbocharger components and the auxiliary air and fuel supply; and FIGS. 2 and 3 are graphs on which are plotted the inventive achievement of the maximum fuel quantity (full-load quantity) after initiation of the air injection.

SUMMARY OF THE INVENTION

The present invention applies to an auxiliary combustion air supply arrangement for an internal combustion engine having a combustion air supercharger that is driven by an exhaust gas turbine and that has disposed in its air line, immediately prior to entry thereof into the intake manifold of the internal combustion engine, an automatic valve (check valve or flap) that is opened when an air stream flows in the direction toward the intake manifold, whereby during time periods characterized by a lack of sufficient exhaust gas energy, in order to increase the supply of air to the intake manifold of the internal combustion engine, auxiliary combustion air is obtained directly from a compressed airtank and is supplied to the intake manifold via an appropriate control mechanism, whereby this arrangement is characterized primarily by a delay element as part of a fuel injection system, whereby the control mechanism of the air injection, as well as the delay element, are actuated by operation of a ga pedal associated with the internal combustion engine, as result of which the supply of the auxiliary combustion air precedes the fuel injection that is provided, and an injection of the full fuel injection quantity (full-load quantity) is not initiated until later, either in a sudden manner or pursuant to a slowly rising increase curve.

As has previously been the case, with the present invention the start of an acceleration is also dictated by the desire of the driver. However, with the present invention, when the driver steps on the gas pedal this no longer immediately effects an increase in fuel; rather, stepping on the gas pedal first effects injection of auxiliary air into the engine. Only thereafter is the quantity of fuel increased and adapted to the quantity of air that is present. This ensures that adequately high air proportions are always present in the combustion chamber when the increased quantity of fuel is injected therein.

So that the energy that is present at the exhaust gas turbine of the turbocharger is increased as rapidly as possible, and thus the rotor of the turbocharger is accelerated, the quantities of air that are injected, and the pressure buildup in the intake manifold that is dependent thereon, are coordinated in such a way that the retardation of the maximum set fuel quantity, which is otherwise effected by the insufficient charging pressure, and is due to the LDA that is normally present during accelerations in the injection pumps of the turbocharged Diesel engines, is immediately released by overriding the LDA mechanism. The combustion of the maximum full-load quantity that is thereby injected is then effected without visible production of smoke. This presupposes the connection of the LDA at the intake pipe or manifold.

Taking into account that a less powerful acceleration of the turbocharger may be desirable in many applications, the LDA connection can also be provided between the check flap and the compressor of the turbocharger. This eliminates overriding the LDA by the auxiliary air.

All of the above is inventively achieved by appropriate control of the sequences in the fuel and combustion air systems. In this connection, the air injection should be started a maximum of two seconds prior to achieving the full-load quantity, and should last a maximum of two seconds. In a six-cylinder Diesel engine having a stroke volume or piston displacement of about seven liters and a maximum effective mean pressure of about 16 bar, particularly advantageous is an injection start of 0.4 to 0.5 seconds prior to achieving the full-load quantity, as well as an injection duration of 0.5 to 0.8 seconds (at a pressure of 5 bar in the compressed air tank). The increased fuel supply can be effected in a sudden manner until the full-load quantity is achieved, i.e. the quantity adjustment mechanism of the injection pump is actuated in a sudden manner after the aforementioned time span has elapsed. However, the fuel increase can also have a gradient curve until the maximum fuel quantity (full-load quantity) is achieved, i.e. the quantity adjustment lever of the fuel pump is moved in a retarded manner.

Further specific features of the present invention will be described in detail subsequently.

DESCRIPTION OF PREFERRED EMBODIMENTS

Referring now to the drawings in detail, FIG. 1 illustrates an internal combustion engine 1 and an exhaust-driven turbocharger 2. The turbine 3 of the turbocharger 2 is connected to the internal combustion engine 1 via an exhaust manifold 4. A compressor 5 draws in air via an intake line 6, in which a filter 7 is provided, and then conveys the compressed air via a line 8, in which is disposed a compressor or supercharger intercooler 9, into the suction or intake pipe 11 (combustion air pressure pipe) of the internal combustion engine 1. During this process, an automatic valve 10 (check valve or flap) that is disposed in the combustion air line is open.

A further compressor 12 is connected to the intake line 6 via an auxiliary line 6a. The compressor 12 is driven by the internal combustion engine and serves to generate compressed air for braking. As soon as a certain pressure level is reached in the (non-illustrated) compressed air tank of the brake unit, a valve 16 in a line 13 opens, so that the compressed air from the compressor 12 is conveyed further via the aforementioned line 13 to a compressed air tank 14. This tank is filled to a certain pressure (the setting is effected via a pressure regulator 15 that is disposed in the line 13). The upper limit of the air pressure depends upon the maximum pressure of the brake system.

It is also possible for the additional compressor 12 to exclusively supply the compressed air tank 14. In this case, the pressure in the tank can exceed the pressure of the brake system, and in addition the line to the brake system as well as the valve 16 in the line 13 are eliminated.

The compressed air stored in the tank 14 is used to compensate for the lack of combustion air that occurs in the internal combustion engine during acceleration or start up of the vehicle, and which is caused by the absence of exhaust gas energy in these situations. For this purpose, an auxiliary air line 17 is provided in which is disposed a solenoid valve 18. In the opened state, this valve 18 effects injection of air directly into the intake pipe 11. As a consequence of the arrangement of the automatic valve 10 at the end of the combustion air line 8 immediately prior to entry thereof into the intake pipe or manifold 11 of the internal combustion engine 1, with the valve 10 being closed during air injection, an optimum utilization of the supplied auxiliary compressed air is achieved. Almost no air is lost, and an immediate pressure buildup is effected. This greatly reduces the acceleration time.

The signal for initiating an injection of compressed air is derived from the position of the gas pedal 19. As soon as the driver has stepped on the gas pedal, a delay element 21 in the fuel injection system is actuated, with the delay element 21 acting upon the quantity-adjustment mechanism of the injection pump 22 in order to delay actuation thereof or to move the same at a defined speed. When the gas pedal has reached the full-load position or a position near the full-load position (approximately 80 to 95% of the entire pedal path, with this presuming that the pedal path and the injection quantity are proportional to one another), the control mechanism 20 for the injection of air is actuated. This is effected in a sudden manner by rapidly opening the solenoid valve 18. As will be described subsequently, the opening of the solenoid valve 18 can also be a function of certain engine speeds or vehicle speeds.

The control mechanism 20, which can be of electrical or pneumatic design, has the task of opening the solenoid valve 18 for a certain period of time. As previously mentioned, during this time the compressed air flows out of the tank 14 into the intake pipe 11. As soon as the superpressure in the intake pipe 11 rises above the supercharged pressure in the line 8 (after the supercharger intercooler 9), the automatic valve (check flap 10) closes. In this way, as mentioned above, only the intake pipe space is filled, thereby assuring a rapid supply of combustion air to the internal combustion engine.

Pursuant to the present invention, during the just-described filling process of the engine intake system, there is no increase in the fuel injection, or the increase of the fuel injection is effected with such a gradient that, due to the increased air pressure in the intake pipe due to the air injection, a sufficient fresh air charge is present in the cylinder in order to burn the quantity of fuel that is provided in a soot-free manner. The necessary intervention into the time sequence of the quantity determination of the fuel can be carried out the easiest if the signal transfer is effected in an electrical or electronic manner. In this connection, the delay element 21 is integrated in an electronic control mechanism for the injection pump 22. However, the delay element could also be disposed in the control mechanism of an electrical servo-motor (electronic gas pedal), to thereby effect the delay or retardation of the increase in the fuel quantity. A delayed fuel quantity determination on the basis of a mechanical control mechanism is also possible (for example via pneumatic or hydraulic means).

FIGS. 2 and 3 illustrate the chronological progress of the gas pedal movement "a", the fuel increase "b", and the solenoid valve movement "c" of the air injection valve during an acceleration process. In both graphs the time in seconds is plotted on the abscissa, and the pedal path as well as the fuel quantity (in each case expressed in percentages) are plotted on the ordinate. Also plotted on the ordinate is the opening movement of the air injection valve.

In FIG. 2, the full fuel quantity is delayed and is introduced after a prescribed time, which is necessary for filling the engine cylinder with the compressed air that is injected into the intake pipe. In contrast, the fuel increase in FIG. 3 has a gradient path that, by way of example only, is shown as being linear.

In both FIGS. 2 and 3, the time difference between the start of injection and achieving the full-load quantity (start of the full fuel injection) is emphasized by the reference numeral 23. The duration of injection is indicated by the interval 24.

After the start of the air injection, the effect thereof also follows as a consequence in the exhaust gas system. Due to the increased enthalpy drop at the turbine 3 resulting from the combustion of the commencing fuel increase, the turbine, and along with it the compressor wheel 5, are accelerated. This effect is increased even further in the case of the suddenly increased fuel quantity due to the combustion thereof because not only the quantity of exhaust gas but also the enthalpy thereof now increase more greatly due to the inventive air injection. The rapid increase in speed of the compressor 5 that is coupled with the exhaust-driven turbine results in the rapid increase of the charging pressure in the supercharger line 8. After the conclusion of the injection, the pressure in the line 8 exceeds that in the intake pipe 11, so that the check flap 10 again opens. The acceleration of the engine has now progressed to such an extent that the supercharged pressure is at a high level and no intermittently caused increase in exhaust takes place any more. At this point in time, the control mechanism 20 has already effected the closing of the solenoid valve 18 in order to limit the quantity of auxiliary air that is injected to the necessary level (depending upon type of engine or load situation, a normal volume of air is injected that is between 5 and 50 times the stroke volume of the respective engine). Preferably, ten to twenty times the stroke volume is injected, whereby the pressure in the compressed air tank 14 can be between 2 and 16 bar. The optimum time span for the air injection is adapted to the respective application.

So that compressed air is not unnecessarily used when the engine or the vehicle are operating at a higher speed, i.e. in situations where the turbocharger is already at a high speed, mechanisms are used to block the air injection above an engine or vehicle speed that is appropriate to the method of operation of the vehicle. This can be effected in a simple manner via relays that are controlled by the generator or the tachometers.

A standstill monitor, which is similarly controlled by the generator, assures that no compressed air is injected into the intake pipe when the engine is stopped.

A further dissipation of compressed air out of the tank 14 is prevented in that a renewed air injection can take place only after the gas pedal 19 has moved out of the full-load position and is again stepped on.

Where an electronic regulation is provided for the injection pump, control of the air injection can be realized in a particularly advantageous manner. In such a situation, the air injection can be limited to such cases in which, in addition to achieving the full-load position, or nearly the full-load position, of the gas pedal (approximately 80 to 95%), there is additionally assured that the actuation of the gas pedal is effected with a speed that exceeds a given threshold (the time between idling and full-load position is between 0.1 and 2 seconds). Furthermore, by prescribing a limiting speed curve (depending upon the torque or the load), the air injection can be restricted to operating ranges below a certain speed. In addition, the advantage is achieved of being able to arbitrarily design the function of the injection quantity increase (compare, for example, FIG. 2 where a sudden function or operation is provided).

The present invention can be used particularly advantageously with buses (city buses that make frequent stops), the drive line of which has at its disposal a hydraulic converter with an automatic gear arrangement. In this case, the ability to individually influence the time load characteristic is particularly low (for example no slipping of the coupling or clutch), so that the parameters of the air injection that determine its time characteristic, can be optimally set.

The advantages of the air injection are largely maintained even in interaction with gear shifting mechanisms. In such a case, the initiation of the air injection is also a function of the actuation of the clutch as well as of the gear that is selected.

Finally, it should be noted that the curve of the fuel increase described in FIGS. 2 and 3 can also be effected in conformity with other interrelationships, which depend upon the type of delay element 21 and from the manner with which the compressed air passes into the cylinders of the engine. Similarly, the air injection need not be effected all at once (as shown), but could also be effected in several stages or via cycles of the solenoid valve 18.

The present invention could also be used in conjunction with naturally aspirated engines that emit a burst of smoke when accelerating from a bottom idling speed.

The present invention is, of course, in no way restricted to the specific disclosure of the specification and drawings, but also encompasses any modifications within the scope of the appended claims.

WHAT WE CLAIM IS:

1. In an auxiliary combustion air supply arrangement for an internal combustion engine having a combustion air supercharger that is driven by an exhaust ga turbine and that has disposed in its air line, immediately prior to entry thereof into the intake manifold of said internal combustion engine, an automatic valve that is opened when an air stream flows in the direction toward said intake manifold, whereby during time periods characterized by a lack of sufficient exhaust gas energy, in order to increase the supply of air to said intake manifold, auxiliary combustion air is obtained directly from a compressed air tank and is supplied to said intake manifold via an appropriate control mechanism, the improvement including:

a delay element as part of a fuel injection system, whereby said control mechanism for air injection, as well as said delay element, are actuated by operation of a gas pedal associated with said internal combustion engine, as a result of which the supply of said auxiliary combustion air precedes the fuel injection that is demanded, and an injection of the full fuel injection quantity is not initiated until later, either in a sudden manner or pursuant to a slowly rising increase curve.

2. An arrangement according to claim 1, in which said delay element is integrated within an electronic control means of an injection pump for said internal combustion engine.

3. An arrangement according to claim 1, in which said delay element for delaying an increase in fuel quantity is disposed in a control means of an electric servomotor.

4. An arrangement according to claim 1, in which during an acceleration process, depending upon the engine type and load situation, a normal volume of air is injected that is between 5 and 50 times as great as the displacement of the engine.

5. An arrangement according to claim 1, which includes a line that leads from said compressed air tank to said intake manifold and in which is disposed a solenoid valve for said auxiliary combustion air.

6. An arrangement according to claim 1, which includes a compressor, driven by said internal combustion engine, for a brake system of the vehicle thereof, with a feed line leading from said compressor to said compressed air tank for filling same, and with a pressure regulator being disposed in said feed line.

7. An arrangement according to claim 1, in which said air injection is effected only when certain engine or vehicle speed limitations are maintained.

* * * * *